United States Patent [19]

Deschamps et al.

[11] Patent Number: 5,095,083
[45] Date of Patent: Mar. 10, 1992

[54] PROCESSING AID

[75] Inventors: Jacky P. D. Deschamps, Rantigny; Marc Loibl, Beauvais, both of France

[73] Assignee: General Electric Company, Parkersburg, W. Va.

[21] Appl. No.: 501,567

[22] Filed: Mar. 30, 1990

[30] Foreign Application Priority Data

Apr. 26, 1989 [FR] France ................... 8905537

[51] Int. Cl.$^5$ ........................... C08F 212/10
[52] U.S. Cl. ................................ 526/329.2
[58] Field of Search ..................... 526/329.2

[56] References Cited

U.S. PATENT DOCUMENTS

| | | |
|---|---|---|
| 2,646,417 | 7/1953 | Jennings . |
| 3,427,275 | 2/1969 | Davis ............................. 526/329.2 |
| 3,975,315 | 8/1976 | Parks . |
| 4,782,127 | 11/1988 | Van Nuffel ..................... 526/329.2 |

FOREIGN PATENT DOCUMENTS

| | | |
|---|---|---|
| 0185641 | 6/1986 | European Pat. Off. ......... 526/329.2 |
| 1600621 | 12/1968 | France . |
| 2062817 | 9/1970 | France . |
| 8123149 | 6/1983 | France . |
| 56-139513 | 10/1981 | Japan ............................. 526/329.2 |
| 57-117510 | 7/1982 | Japan ............................. 526/329.2 |
| 61-281106 | 12/1986 | Japan ............................. 526/329.2 |
| 1372676 | 11/1974 | United Kingdom ............ 526/329.2 |
| 2064552 | 6/1981 | United Kingdom ............ 526/329.2 |

OTHER PUBLICATIONS

*Experiments in Polymer Science,* Collins et al., John Wiley & Sons, In. (1973), pp. 147-149.

*Primary Examiner*—Joseph L. Schofer
*Assistant Examiner*—N. Sarofim
*Attorney, Agent, or Firm*—Lowe, Price, LeBlanc & Becker

[57] ABSTRACT

The invention deals with a processing aid for polymeric compositions. The processing aid is a terpolymer comprising 10-49% by weight of a vinyl aromatic monomer like styrene, 5-35% by weight of an acrylic nitrile, like acrylonitrile and 21-60% by weight of an alkylacrylate or alkylmethacrylate with a viscosity number of more than four as measured in dimethylformamide at 30+ C. at a concentration of 100 mg terpolymer per 100 ml dimethylformamide.

2 Claims, No Drawings

PROCESSING AID

FIELD OF THE INVENTION

The invention relates to a terpolymer derived from a vinylaromtic monomer, an acrylic nitrile and an alkylacrylate or alkylmethacrylate.

The invention further relates to thermoplastic resin compositions comprising the terpolymer according to the invention as a processing aid.

The invention also relates to objects made out of the thermoplastic resin composition according to the invention.

BACKGROUND OF THE INVENTION

Terpolymers derived from a vinyl aromatic monomer, an acrylic nitrile and an alkylacrylate or alkylmethacrylate are known processing aids for vinylhalide (co)polymers. U.S. Pat. No. 2,646,417 describes processing aids in the form of styrene interpolymers made from monomeric mixtures containing as the two essential monomers from 50 to 90% by weight of styrene and from 10–50% by weight of an acrylic nitrile, in which other monolefinic monomers like ethylacrylate, vinyl acetate, vinyl benzoate, methyl methacrylate may be present but only in minor amounts of less than 20% by weight. Said known processing aids are used in a quantity of 1 to 10% by weight to lower the processing temperature of non-plasticized vinyl halide resins. The known processing aids should be "high in molecular weight".

The one example dealing with terpolymers describes a terpolymer of 65% by weight of styrene, 25% acrylonitrile and 10% by weight of ethylacrylate.

U.S. Pat. No. 3,975,315, corresponding with FR-A-2,062,817 describes "copolymers of a styrene containing about 10 to 40% of a bound acrylonitrile or 25 to 75% of an alkyl substituted acrylate or both". Said copolymers should have a "dilute solution viscosity greater than about 1.5". By incorporating 5 to 20 weight parts, per 100 weight parts of a vinylchloride polymer, of said copolymer the vinylchloride when expanded has upon extrusion sufficient hot strength. According to this prior art it is preferred to use copolymers with greater than 50%, even more preferred with 60 to 90 weight percent of styrene and 10 to 40 weight percent of acrylonitrile, more preferably 15 to 35%. The styrene copolymer may also contain an alkyl methacrylate or ethacrylate in addition to, or in place of, the nitrile in amounts from 5 to 75%, preferably 40 to 60%. The "dilute solution viscosity" of the copolymer is preferably greater than 2.5. It seems to have been determined in a 1% monochlorobenzene solution at a non-disclosed temperature.

FR-A-1.600.621 mentions in very general terms the possibility to use high molecular weight methyl-methacrylate-styrene-acrylonitrile terpolymers as an agent to make polymers more suitable for expansion.

SUMMARY OF THE INVENTION

The present invention deals with novel terpolymers which may be used as a processing aid for thermoplastic resin compositions. The terpolymers according to the invention have been derived from a vinylaromatic monomer, an acrylic nitrile and an alkylacrylate or alkylmethacrylate.

The terpolymers according to the invention have the following advantageous properties:

They can be incorporated in thermoplastic resin compositions such as for example compositions comprising a vinylhalide polymer or copolymer. When incorporated in such thermoplastic compositions they decrease the gel time thereof, they improve the thermal stability thereof, they are dispersable, they improve the viscoelasticity thereof and they increase the hot elongation thereof.

A further advantage of the terpolymers according to the invention is that they can be made easily with a very low residual styrene monomer content (of less than 500 ppm after drying). This is important for applications where the thermoplastic resin composition comprising the terpolymer according to the invention comes into contact with food.

The terpolymer according to the invention further offers the advantage that by changing the ratio of the monomers in it one may adopt the refractive index to match the refractive index of the thermoplastic polymer in which it is incorporated.

In view of the above indicated properties the terpolymers according to the invention can be used as a processing aid for vinylhalide (co)polymers to make them better suitable for calendering, extrusion, blow moulding, injection moulding, expansion into foam and for making bi-oriented materials such as described for example in FR-A-8123149.

DETAILED DESCRIPTION

The terpolymers according to the invention are characterized in that the terpolymer comprises 10–49% by weight of the vinylaromatic monomer,
5–35% by weight of the acrylic nitrile and
21–60% by weight of the alkylacrylate or alkylmethacrylate and has a reduced viscosity of more than four as measured in dimethylformamide at 30° C. at a concentration of 100 mg terpolymer per 100 ml dimethylformamide.

It is preferred to have a terpolymer which comprises
26–49% by weight of the vinylaromatic monomer,
5–14% by weight of the acrylic nitrile and
37–60% by weight of the alkylacrylate or alkylmethacrylate and has a reduced viscosity of five or more as measured in dimethylformamide at 30° C., at a concentration of 100 mg terpolymer per 100 ml dimethylformamide.

The present invention also deals with thermoplastic resin compositions comprising at least one thermoplastic resin and a polymeric processing aid characterized in that the composition comprises as a processing aid a terpolymer comprising 10–49% by weight of a vinylaromatic monomer,
5–35% by weight of an acrylic nitrile and
21–60% by weight of an alkylacrylate or alkylmethacrylate, with a reduced viscosity of more than four as measured in dimethylformamide at 30° C., at a concentration of 100 mg terpolymer per 100 ml dimethylformamide.

The thermoplastic resin composition comprises preferably as a processing aid a terpolymer comprising
26–49% by weight of the vinylaromatic monomer,
5–14% by weight of the acrylic nitrile and
37–60% by weight of the alkylacrylate
or alkylmethacrylate, with a reduced viscosity of five or more measured in dimethylformamide at 30° C., at a concentration of 100 mg terpolymer per 100 ml dimethylformamide.

The thermoplastic resin composition can comprise a vinylhalide (co)polymer and a processing aid in a quantity of 0.1-20 parts by weight per 100 parts by weight of the vinylhalide (co)polymer.

The invention further includes objects formed out of the thermoplastic composition according to the invention.

The terpolymer according to the invention comprises 10-49% by weight of the vinylaromatic monomer, 5-35% by weight of the acrylic nitrile and 21-60% by weight of the alkylacrylate or alkylmethacrylate. It has a viscosity number of more than four as measured in dimethylformamide at 30° C., at a concentration of 100 mg terpolymer per 100 ml dimethylformamide.

As vinylaromatic monomer may be used styrene, alpha methylstyrene, halogenated styrene, vinyltoluene, alkoxystyrene and other styrene derivates that are copolymerisable with an acrylic nitrile and an alkyl(-meth)acrylate.

Suitable acrylic nitrile monomers are for example methacrylonitrile, ethacrylonitrile, chloroacrylonitrile, acrylonitrile and the like.

Suitable alkylacrylates and alkylmethacrylates are for example methyl- and ethylacrylate and the corresponding methacrylates.

The viscosity number of the terpolymer according to the invention is critical: it should be above four, by preference five or more measured as indicated above. When the viscosity number is four or lower one does not obtain the desired improvement in visco-elasticity and hot elongation.

This viscosity number has been determined as further outlined in the examples.

The relative amounts of the monomers in the terpolymer as indicated above are critical also for achieving the desired results.

The terpolymers according to the invention can be incorporated in thermoplastic resin compositions in order to improve the properties thereof. Suitable thermoplastic polymers are polystyrenes and polyphenylene ethers. Particularly suitable seem at present the polymers and copolymers derived from vinylhalide monomers.

EXAMPLE I:

Preparation of the Terpolymer

Several terpolymers with different viscosity numbers have been prepared as follows.

A 16 liter batch reactor was filled with 8880 grams of deionised water, 2 grams sodium phosphate, 2 grams potassium persulfate and 56 grams sodium dodecylsulfate. The contents were agitated (with a stirrer rotating at 200 rounds per minute). The contents were degassed by evacuation; subsequently the reactor was filled with nitrogen. The reactor was heated to 65° C. Upon reaching a temperature of 50° C. the following monomers were added: 560 grams acrylonitrile, 1920 grams styrene and 1520 grams methylmethacrylate. The monomers were reacted for 4 to 7 hours at 65° C. Total conversion after 7 hours was about 99%.

The product as obtained above was destabilised by pouring it under stirring in a 10% by weight calcium chloride solution with a temperature of 92° C. The obtained flocculated product was centrifugated and dried in a fluid bed at 80° C. for one hour. The so obtained dry powder was seeved to a particle size below 1 mm. The chemical composition of the obtained terpolymer after 7 hours was as follows: 48% by weight styrene, 14% by weight acrylonitrile and 38.0% by weight methylmethacrylate, with a refractive index N of 1.545. The so obtained powders were utilised in the examples.

EXAMPLE II:

Determination of the Viscosity Number 50 milligrams of the terpolymer powder were dissolved in 50 ml filtered dimethylformamide. About 15-20 ml of the obtained solution were brought into an Ubbelhode viscosimeter (placed in a thermostatic bath at 30° C.). The used viscosimeter possessed an out flow constant (c) of about 0.004672. The inner diameter of the capillary tube was 0.53 millimeter. The time lapsed for passing of the solution over a well defined, fixed distance in the viscosimeter was measured five times, with an accuracy of about 0.1 seconds. A similar measurement was performed for the solvent separately without any terpolymer dissolved therein. The viscosity number was calculated as follows:

$$\text{Viscosity number} = \frac{t - t_0}{2P \cdot t_0} \text{ in dl/g}$$

wherein t is the time for the solution, $t_0$ the time for the pure solvent and P the number of grams terpolymer per 100 ml solvent.

It has been tried to determine the viscosity of a terpolymer according to the invention with a viscosity number of about 5, determined as indicated above, in a 1% monochlorobenzene solution as indicated in col. 6, line 40 of U.S. Pat. No. 3,975,315. The terpolymer according to the invention did not dissolve at 30° C. in monochlorobenzene. By making a monochlorobenzene solution of 0.1% by weight of one reaches a value for the viscosity number of 7.6 which is far above the values mentioned in U.S. Pat. No. 3,975,315.

Total of 5 terpolymers have been prepared with viscosity numbers of 2, 5, 6, 7, 8 dl/g respectively.

The residual content of monomers in the terpolymer with a viscosity number of 7 dl/g was as follows: styrene about 370 ppm; methylmethacrylate about 300 ppm and acrylonitrile below 10 ppm.

EXAMPLE III:

Preparation of Thermoplastic Composition

Said terpolymers were incorporated in a rigid polyvinyl chloride composition with the following ingredients:

|  | Parts by weight |
| --- | --- |
| PVC-resin with K-value 57-58 | 100 |
| epoxidised soja beanoil | 2 |
| Irgastab 17 (stabiliser) | 1.5 |
| tris-(nonylphenyl)phosphite (TNPP) | 0.5 |
| Calciumstearate | 0.3 |
| Loxiol G15 | 1.5 |
| Blend of three waxes | 0.7 |
| terpolymer according to the invention, in quantities as indicated below for the described tests. | |

2 Parts by weight of the terpolymer prepared as indicated hereabove with a viscosity number of 7 dl/g were incorporated in the above mentioned PVC composition.

All components were blended in a high speed mixer at 120° C.

EXAMPLE IV:

Determination of Gel Time, Thermal Stability

The so obtained composition (60 cm$^3$) was tested in a Brabender plastograph at 170° C., at 30 rpm to determine the gel time=fusion time. This is the time period from the start of blending till a maximum in the torque has been reached. For comparative purposes the gel time has also been determined for the same PVC composition without terpolymer. The results were as follows:

|  | Gel time (minutes) |
| --- | --- |
| PVC without terpolymer | 8.00 |
| PVC with 2 parts terpolymer | 4.00 |

As can be seen the gel time is greatly reduced by incorporating the terpolymer according to the invention.

A similar PVC composition as tested above with 8 parts by weight of the terpolymer with a viscosity number of 7 dl/g was tested for its thermal stability. To this end the composition was processed into a foamed sheet. The test specimen was taken after a certain time from a two roll mill at 200° C.

After 10 minutes the composition hardly showed any yellowing; after 15 minutes some light yellowing occurred. This is similar as for PVC compositions without terpolymer.

EXAMPLE V:

Determination of the Elasticity of Molten PVC

A series of PVC compositions was prepared with a composition as indicated above, to which 2 parts by weight of a terpolymer with an indicated viscosity number, prepared as indicated above, was added. As a control a composition without terpolymer has been tested.

TABLE A

| PVC composition with 2 parts terpolymer of indicated viscosity (dl/g) | Hot elongation (%) |
| --- | --- |
| CONTROL | 320 |
| 2 | 360 |
| 5 | 580 |
| 6 | 640 |
| 7 | 680 |
| 8 | 720 |

The results show that there is a critical value for the viscosity number of about 4, possibly 5.

EXAMPLE VI:

Determination of Visco-elasticity

A series of similar PVC compositions as indicated above to which had been added 0.5 parts by weight of a terpolymer with various viscosity numbers, prepared as indicated above, were tested for blow moulding twenty (1 liter) bottles of each composition. Average extrusion temperature was about 170° C. The parison was extruded through a die with an outer diameter of 31 mm and an inner diameter of 29.7 mm. The extruder operated at 25 rounds per minute. The relative increase in weight of the bottles (%) as compared to bottles made of a control PVC composition without terpolymer was determined. This is a good measure for the visco elasticity i.e. the higher the weight increase the greater the increase in viscoelasticity of the molten PVC. A greater viscoelasticity is of importance to get a better control of the wall thickness of the parison. The obtained results are summarized in table B.

TABLE B

| PVC composition with 0.5 parts terpolymer of viscosity number in dl/g | Increase in weight of the bottle (%) |
| --- | --- |
| 2 | 2 |
| 5 | 10 |
| 6 | 13 |
| 7 | 14.5 |
| 8 | 16 |

Here again it can be seen that there is a critical limit for the viscosity number of about 5 dl/g.

We claim:

1. Terpolymer derived from a vinylaromatic monomer, an acrylic nitrile and an alkylacrylate or alkylmethacrylate, characterized in that the terpolymer comprises 10–49% by weight of the vinylaromatic monomer,
5–35% by weight of the acrylic nitrile and
21–60% by weight of the alkylacrylate or alkylmethacrylate and has a viscosity number of more than four dl/g as measured in dimethylformamide at 30° C. at a concentration of 100 mg terpolymer per 100 ml dimethylformamide.

2. Terpolymer according to claim 1, characterized in that the terpolymer comprises 26–49% by weight of vinylaromatic monomer,
5–14% by weight of the acrylic nitrile and
37–60% by weight of the alkylacrylate or alkylmethacrylate and has a viscosity number of five dl/g or more as measured in dimethylformamide at 30° C. at a concentration of 100 mg terpolymer per 100 ml dimethylformamide.

* * * * *